United States Patent
Kim et al.

(10) Patent No.: US 9,348,163 B2
(45) Date of Patent: May 24, 2016

(54) LIQUID CRYSTAL DISPLAY AND METHOD OF MANUFACTURING THE SAME

(71) Applicant: SAMSUNG DISPLAY CO., LTD., Yongin, Gyeonggi-do (KR)

(72) Inventors: Yong Seok Kim, Seoul (KR); Won Tae Kim, Gyeonggi-do (KR); Han Joon Yoo, Seoul (KR); Dae Ho Lee, Seoul (KR); Kyung Tae Chae, Gyeonggi-do (KR); Jong Seong Kim, Seoul (KR); Woo Jae Lee, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 118 days.

(21) Appl. No.: 13/904,695

(22) Filed: May 29, 2013

(65) Prior Publication Data

US 2014/0204316 A1 Jul. 24, 2014

(30) Foreign Application Priority Data

Jan. 21, 2013 (KR) .................. 10-2013-0006679

(51) Int. Cl.
*G02F 1/1339* (2006.01)
*G02F 1/1333* (2006.01)

(52) U.S. Cl.
CPC ................ *G02F 1/133377* (2013.01)

(58) Field of Classification Search
None
See application file for complete search history.

(56) References Cited

U.S. PATENT DOCUMENTS

| | | | | |
|---|---|---|---|---|
| 5,469,280 A * | 11/1995 | Jang | ................. | 349/74 |
| 5,726,728 A * | 3/1998 | Kondo et al. | ................. | 349/156 |
| 6,141,072 A | 10/2000 | Drabik et al. | | |
| 6,469,761 B1 | 10/2002 | Drabik et al. | | |
| 6,882,399 B2 * | 4/2005 | Park | ................. | 349/106 |
| 2001/0006409 A1 * | 7/2001 | Lee | ................. | 349/156 |
| 2003/0133069 A1 * | 7/2003 | Jeong et al. | ................. | 349/156 |
| 2005/0146669 A1 * | 7/2005 | Yeh et al. | ................. | 349/141 |
| 2006/0093928 A1 * | 5/2006 | Hung et al. | ................. | 430/7 |
| 2007/0146598 A1 * | 6/2007 | Yokokawa et al. | ................. | 349/123 |
| 2007/0291216 A1 * | 12/2007 | Chan et al. | ................. | 349/153 |
| 2008/0030833 A1 * | 2/2008 | Park | ................. | 359/259 |
| 2010/0231843 A1 * | 9/2010 | Tadaki | ................. | 349/156 |
| 2011/0140103 A1 * | 6/2011 | Lee et al. | ................. | 257/43 |
| 2012/0062448 A1 * | 3/2012 | Kim et al. | ................. | 345/55 |
| 2013/0321734 A1 | 12/2013 | Won et al. | | |
| 2014/0152948 A1 | 6/2014 | Chae et al. | | |
| 2015/0092130 A1 * | 4/2015 | Lee et al. | ................. | 349/43 |

FOREIGN PATENT DOCUMENTS

| | | |
|---|---|---|
| CN | 103631061 | 3/2014 |
| JP | 2006-285001 | 10/2006 |
| JP | 2007-010888 | 1/2007 |
| JP | 2007-304452 | 11/2007 |

(Continued)

*Primary Examiner* — Richard Kim
(74) *Attorney, Agent, or Firm* — F. Chau & Associates, LLC

(57) ABSTRACT

A liquid crystal display is provided. A passivation layer is disposed on a substrate. A first microcavity is disposed on the passivation layer. A second microcavity is disposed on the passivation layer and spaced apart from the first microcavity at a first spacing and along a first direction. A fixing member is disposed between the first microcavity and the second microcavity. A roof layer is disposed on the first and the second microcavities and the fixing member, wherein the first and the second microcavities include liquid crystal molecules.

20 Claims, 21 Drawing Sheets

(56) References Cited

FOREIGN PATENT DOCUMENTS

| | | |
|---|---|---|
| JP | 2009-128473 | 6/2009 |
| JP | 2010-210832 | 9/2010 |
| JP | 2014-041352 | 3/2014 |
| KR | 1020030063656 | 7/2003 |
| KR | 1020120026880 | 3/2012 |
| KR | 1020130134153 | 12/2013 |
| KR | 1020140025739 | 3/2014 |

\* cited by examiner

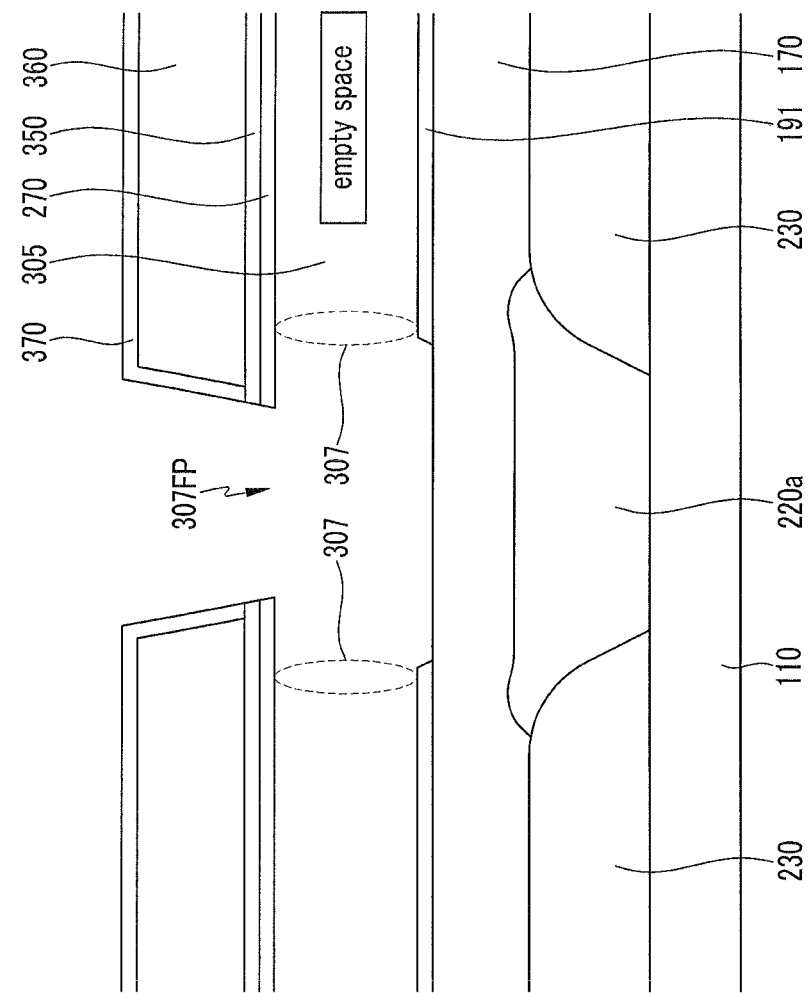

FIG.16
 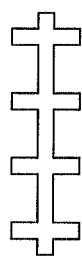  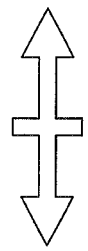
(a)  (b)  (c)  (d)

LIQUID CRYSTAL DISPLAY AND METHOD OF MANUFACTURING THE SAME

CROSS-REFERENCE TO RELATED APPLICATION

This application claims priority under 35 U.S.C. §119 to Korean Patent Application No. 10-2013-0006679 filed on Jan. 21, 2013 in the Korean Intellectual Property Office, the disclosure of which is incorporated herein in its entirety.

TECHNICAL FIELD

The present invention relates to a liquid crystal display and a manufacturing method thereof.

DISCUSSION OF RELATED ART

Liquid crystal displays generate an electric field to after the orientations of liquid crystal molecules of the liquid crystal layer and control polarization of incident light, thereby displaying an image. Liquid crystal molecules may be held in a microcavity structure.

SUMMARY

According to an exemplary embodiment of the present invention, a liquid crystal display is provided. A passivation layer is disposed on a substrate. A first microcavity is disposed on the passivation layer. A second microcavity is disposed on the passivation layer and spaced apart from the first microcavity at a first spacing and along a first direction. A fixing member is disposed between the first microcavity and the second microcavity. A roof layer is disposed on the first and the second microcavities and the fixing member, wherein the first and the second microcavities include liquid crystal molecules.

According to an exemplary embodiment of the present invention, a method of manufacturing a liquid crystal display is provided. A thin film transistor is formed on a substrate. A first passivation layer is formed on the thin film transistor. A fixing member is formed on the first passivation layer. A pixel electrode is formed on the first passivation layer. A sacrificial layer is formed on the pixel electrode. A roof layer is formed on the sacrificial layer. The sacrificial layer is removed to form a plurality of microcavity having a liquid crystal injection hole. A liquid crystal material is injected into the plurality of microcavity. A capping layer is formed on the roof layer to cover the liquid crystal injection hole. The roof layer covers the fixing member.

According to an exemplary embodiment of the present invention, a method manufacturing a liquid crystal display is provided. A thin film transistor is formed on a substrate. An organic layer is formed on the thin film transistor. A groove is formed in the organic layer. A pixel electrode is connected to one terminal of the thin film transistor. A sacrificial layer is formed on the pixel electrode. A roof layer is formed on the sacrificial layer and fills the groove. The sacrificial layer is removed to form a plurality of microcavity having a liquid crystal injection hole. A liquid crystal material is injected into the plurality of microcavity. A capping layer is formed to cover the liquid crystal injection hole on the roof layer.

BRIEF DESCRIPTION OF THE DRAWINGS

These and other features of the present invention will become more apparent by describing in detail exemplary embodiments thereof with reference to the accompanying drawings of which:

FIG. 16 is a schematic diagram of an open region in a plane view in the exemplary embodiment of FIG. 15;

DETAILED DESCRIPTION OF THE EMBODIMENTS

Figure 1:
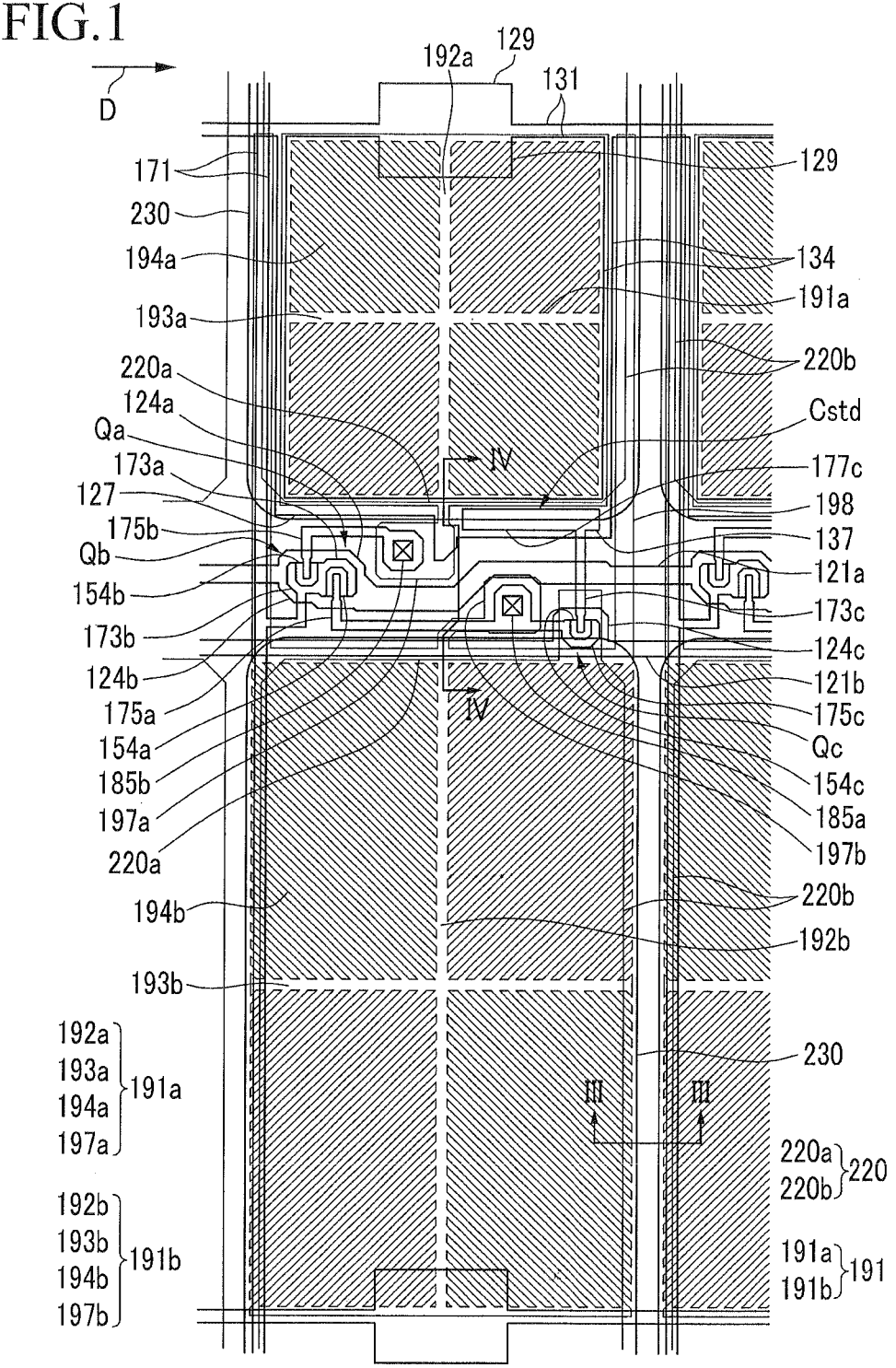
FIG. 1 is a top plan view of a liquid crystal display according to an exemplary embodiment of the present invention.

Exemplary embodiments of the present invention will be described in detail with reference to the accompanying drawings. However, the present invention may be embodied in different forms and should not be construed as limited to the embodiments set forth therein.

In the drawings, the thickness of layers, films, panels, regions, etc., are exaggerated for clarity. It will be understood that when a layer is referred to as being "on" another layer or substrate, it may be directly on the other layer or intervening layers may also be present. Like reference numerals may designate like elements throughout the specification and drawings.

Figure 2:
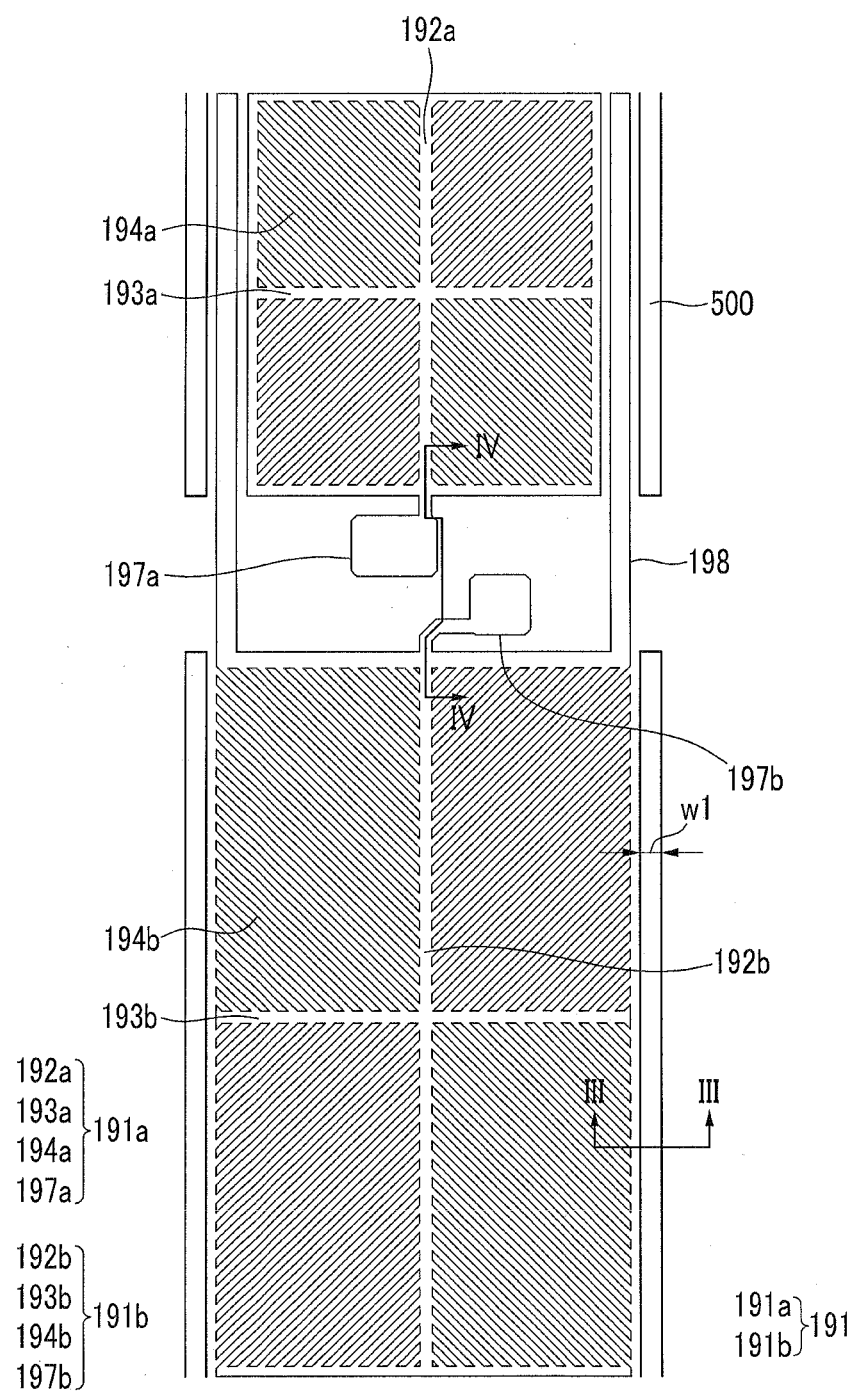
FIG. 2 is a top plan view of an arrangement of a fixing member according to an exemplary embodiment of the present invention in FIG. 1.
Figure 3:
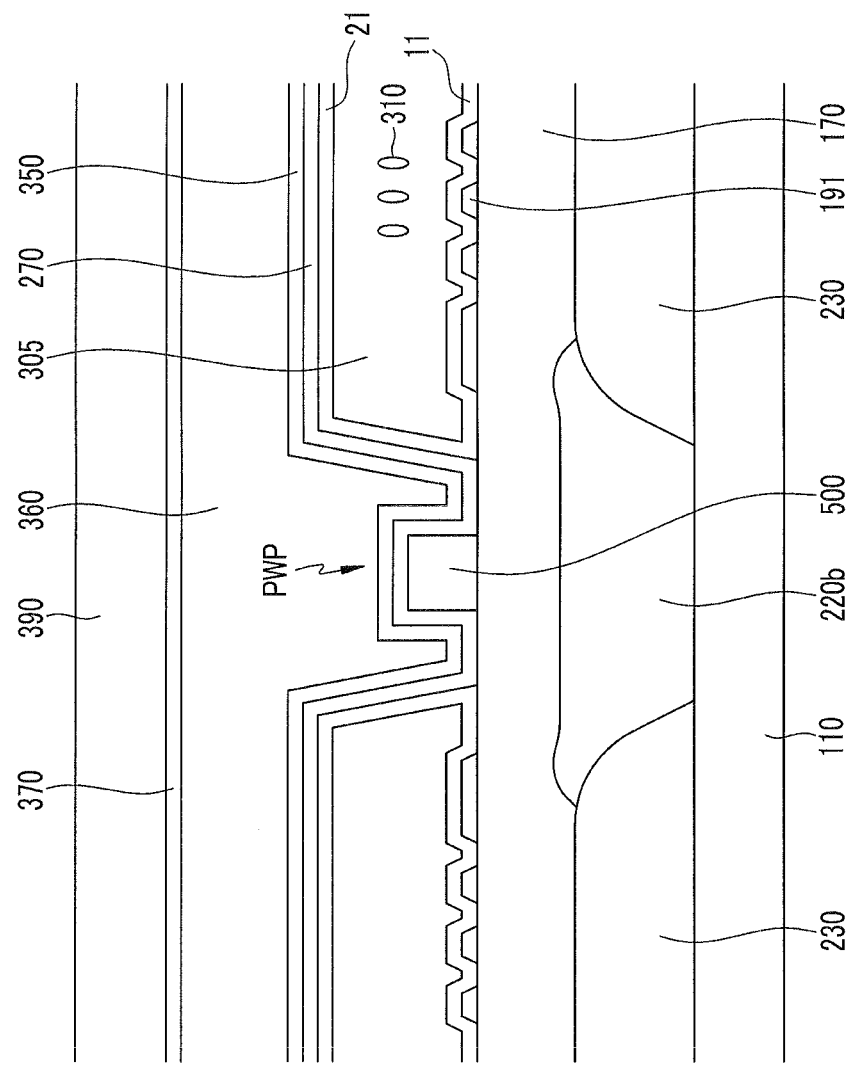
FIG. 3 is a cross-sectional view taken along line of FIG. 1.
Figure 4:
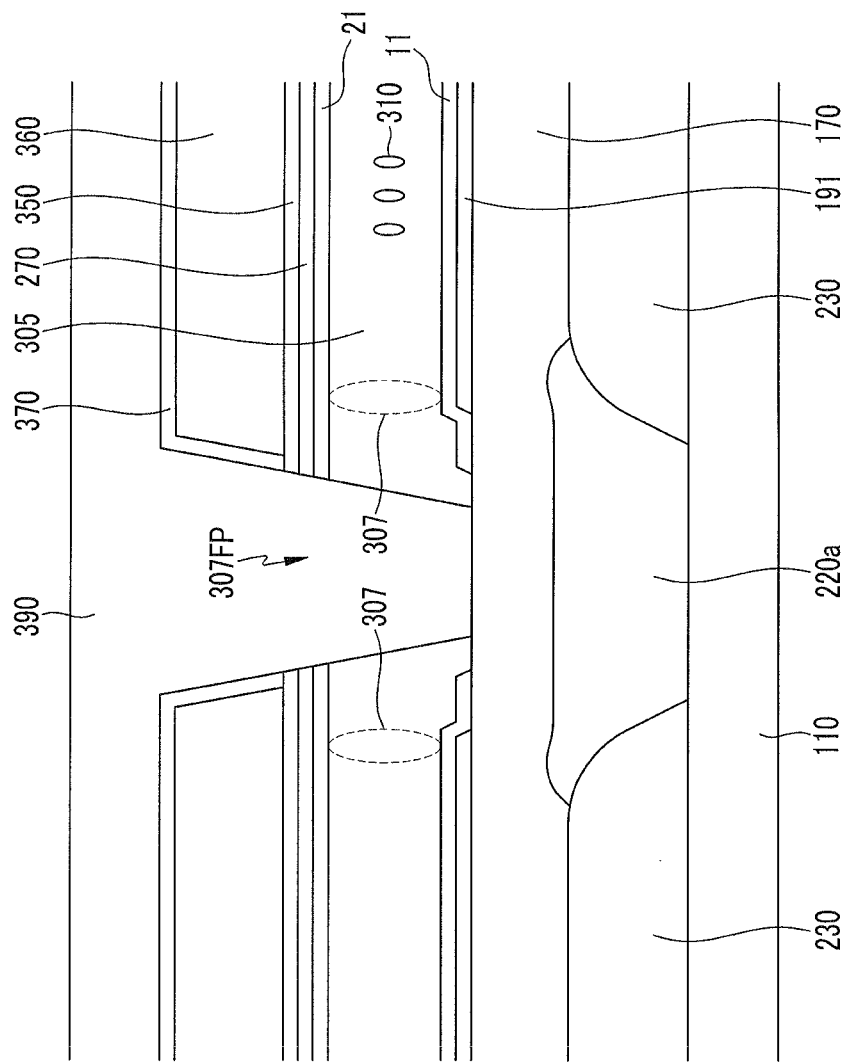
FIG. 4 is a cross-sectional view taken along line IV-IV of FIG. 1.
Figure 5:
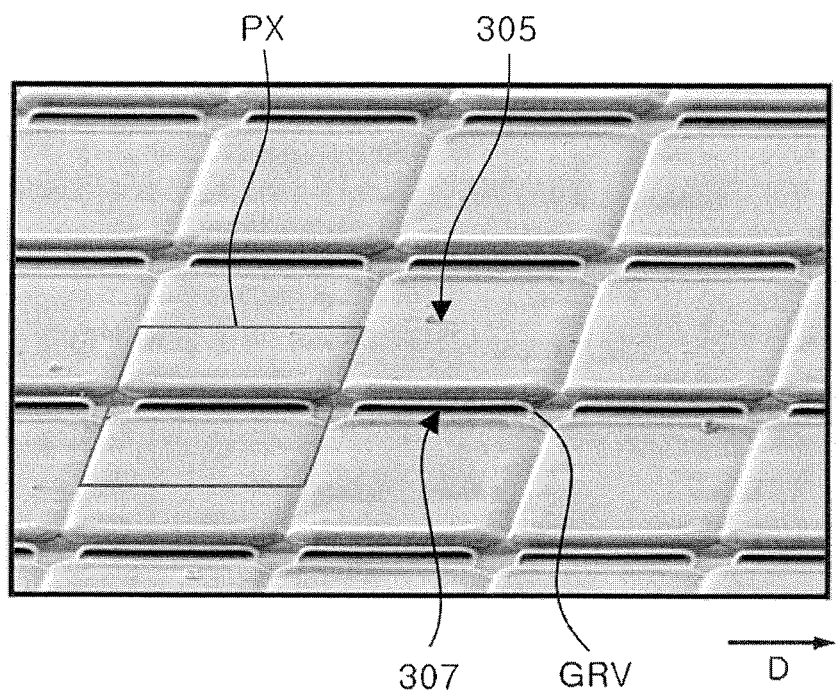
FIG. 5 is a perspective view of a microcavity according to an exemplary embodiment of the present invention.

FIG. 1 is a top plan view of a liquid crystal display according to an exemplary embodiment of the present invention. FIG. 2 is a top plan view to explain an arrangement of a fixing member of FIG. 1 according to an exemplary embodiment of the present invention. FIG. 3 is a cross-sectional view taken along line of FIG. 1. FIG. 4 is a cross-sectional view taken along line IV-IV of FIG. 1. FIG. 5 is a perspective view of a microcavity according to an exemplary embodiment of the present invention.

Referring to FIGS. 1 to 3, thin film transistors Qa, Qb, and Qc are disposed on a substrate 110 including transparent glass or plastic.

Color filters 230 are disposed on the thin film transistors Qa, Qb, and Qc, and a light blocking member 220 may be formed between neighboring color filters 230. For simplicity of drawings, the thin film transistors Qa, Qb, and Qc are omitted in FIGS. 3 and 4, although the thin film transistors Qa, Qb, and Qc are disposed between the substrate 110 and the color filters 230.

The color filters 230 are extended along a column of the pixel electrode 191. Each of the color filters 230 may display one of primary colors such as three primary colors of the red, green, and blue. However, it is not limited to the three primary colors such as red, green, and blue, and may display one of cyan, magenta, yellow, and white-based colors.

Adjacent color filters 230 are spaced apart from each other and are arranged in rows and columns to form an array as shown in FIG. 1. For example, FIGS. 3 and 4 show the color filters 230 spaced apart from each other in row and column directions, respectively.

Referring to FIG. 3, a longitudinal light blocking member 220b is disposed between the color filters 230 spaced apart along the horizontal direction or row direction D. The longitudinal light blocking member 220b partially overlaps each edge of the adjacent color filters 230, and the overlapped regions may have substantially the same area as each other.

Referring to FIG. 4, a transverse light blocking member 220a is disposed between the color filters 230 spaced apart along the vertical direction or column direction. The transverse light blocking member 220a partially overlaps each edge of the adjacent color filters 230, and the overlapped region may have substantially the same area as each other.

The arrangement of the color filters 230 is not limited to the array arrangement as shown in FIGS. 1 to 4. For example, the light blocking member 220 may be disposed in a microcavity 305 that will be described later.

A first passivation layer 170 is disposed on the color filter 230 and the light blocking member 220. The first passivation layer 170 may include an organic material and may be disposed to provide a planarized surface on films disposed thereunder.

A pixel electrode 191 is disposed on the first passivation layer 170, and the pixel electrode 191 is electrically connected to one terminal of the thin film transistors Qa and Qb through contact holes 185a and 185b as shown in FIG. 1.

A lower alignment layer 11 is disposed on the pixel electrode 191, and the lower alignment layer 11 may be a vertical alignment layer. The lower alignment layer 11 may serve to align liquid crystal molecules 310 and may include polyamic acid, polysiloxane, and/or polyimide.

An upper alignment layer 21 faces the lower alignment layer 11. A microcavity 305 is disposed between the lower alignment layer 11 and the upper alignment layer 21. For example, the microcavity 305 is a space enclosed by the lower alignment 11 and the upper alignment layer 21 and includes a liquid crystal injection hole 307. The liquid crystal molecules 310 are injected to the microcavity 305 through the liquid crystal injection hole 307. In an exemplary embodiment, the microcavity 305 has the liquid crystal injection hole 307 along the column direction of the pixel electrode 191 or the vertical direction. The liquid crystal molecules 310, by a capillary force, are injected to the microcavity 305 through the liquid crystal injection hole 307.

In an exemplary embodiment, as shown in FIG. 2 and FIG. 3, a partition forming region PWP is disposed between the microcavities 305 adjacent in the horizontal direction, and a patterned structure 500 extended along the vertical direction is disposed at the partition forming region PWP. The patterned structure 500 has a width w1 smaller than the partition forming region PWP. The patterned structure 500 may include a photoresist, an organic material, and/or an inorganic material. Since the patterned structure 500 increases a contact area of a roof layer 360 (which will be explained below), the patterned structure 500 serves as a fixing member to prevent the roof layer 360 from being lifted off in a subsequent process In an exemplary embodiment, the liquid crystal injection hole 307 is disposed at both edges of one microcavity 305 as shown in FIG. 5. Alternatively, one liquid crystal injection hole may be disposed at only one edge of one microcavity 305.

The upper alignment layer 21 is disposed on the microcavity 305, and a common electrode 270 and a lower insulating layer 350 are disposed on the upper alignment layer 21. The common electrode 270 receives a common voltage, and generates an electric field along with the pixel electrode 191 applied with a data voltage to determine an inclination direction of the liquid crystal molecules 310 disposed in the microcavity 305 between the two electrodes. The common electrode 270 constitutes a capacitor along with the pixel electrode 191, and the applied voltage is maintained after the thin film transistor is turned off. The lower insulating layer 350 may include silicon nitride (SiNx) and/or silicon oxide (SiO2).

In an exemplary embodiment, the common electrode 270 is disposed on the microcavity 305. Alternatively, the common electrode 270 may be disposed under the microcavity 305 to drive the liquid crystal according to a coplanar electrode (CE) mode.

A roof layer 360 is disposed on the lower insulating layer 350. The roof layer 360 may include a silicon oxycarbide (SiOC), a photoresist, and/or other organic materials. When the roof layer 360 includes the silicon oxycarbide (SiOC), the roof layer 360 may be formed by a chemical vapor deposition method. The roof layer 360 having SiOC has a high light transmittance. The roof layer 360 having SiOC may have a low residual stress and be less subject to deformation. Alternatively, when including the photoresist, the roof layer 360 may be formed by a coating method.

A liquid crystal injection hole formation region 307FP is disposed between two adjacent microcavities 305, penetrating the common electrode 270, the lower insulating layer 350, and the roof layer 360 and overlaps the transverse light blocking member 220a. The liquid crystal injection hole formation region 307FP is covered by a capping layer 390 that will be described later.

An upper insulating layer 370 is disposed on the roof layer 360. The upper insulating layer 370 covers an upper surface and a side wall of the roof layer 360. The upper insulating layer 370 may include silicon nitride (SiNx) and/or silicon oxide (SiO2). The capping layer 390 is disposed on the upper insulating layer 370. The capping layer 390 covers the upper surface and the side surface of the upper insulating layer 370, and the capping layer 390 covers the liquid crystal injection hole 307 of the microcavity 305 exposed by the liquid crystal injection hole formation region 307FP. The capping layer 390 may include thermal hardening resin, silicon oxycarbide (SiOC), and/or graphene.

In an embodiment, the capping layer 390 including graphene serves to prevent a gas including helium, oxygen and/or moisture from permeating the capping layer 390. Accordingly, the capping layer 390 protects the liquid crystal molecules 307 from oxygen and/or moisture. Alternatively, the capping layer 390 may include a carbon combination, and the liquid crystal molecules 310 is not contaminated even if the capping layer 390 contacts the liquid crystal molecules 310.

An overcoat (not shown) may be disposed on the capping layer 390 and may include an organic layer and/or an inorganic layer. The overcoat may protect the liquid crystal molecules 310 injected into the microcavity layer 305 from an external impact, and may provide a planarized surface to the capping layer 390.

Next, the microcavity 305 will be described in detail with reference to FIG. 1 and FIG. 3 to FIG. 5.

Referring to FIG. 1 and FIG. 3 to FIG. 5, the microcavities 305 are arranged along the column or vertical direction. A plurality of liquid crystal injection hole formation region 307FP is disposed at the portion overlapping a gate line 121a and faces in the column direction. A plurality of microcavities 305 may respectively correspond to a pixel area. Here, the pixel area may correspond to a region displaying images.

In an exemplary embodiment, two sub-pixel electrodes 191a and 191b are disposed via the gate line 121a interposed therebetween. Accordingly, a first sub-pixel electrode 191a and a second sub-pixel electrode 191b respectively included in the pixels PX adjacent to each other in the vertical direction may correspond to one microcavity 305. However, this structure changes the thin film transistor and pixel electrode structure such that this structure may be changed into a shape in which the microcavity 305 corresponds to one pixel PX.

The liquid crystal injection hole formation region 307FP is disposed between the microcavities 305 and along the row direction D that the gate line 121a extends. The liquid crystal injection hole 307 of the microcavity 305 is formed at a boundary portion of the liquid crystal injection hole formation region 307FP and the microcavity 305. The liquid crystal injection hole 307 extends along a direction that the liquid crystal injection hole formation region 307FP extends.

The partition forming region PWP is disposed between the microcavities 305 adjacent in the direction D that the gate line 121a extends. The patterned structure 500 is disposed in the pattern forming region PWP. The roof layer 360 is disposed on the patterned structure 500, as shown in FIG. 3. The partition forming region PWP is filled with the lower insulating layer 350, the common electrode 270, the upper insulating layer 370, and the roof layer 360. The partition forming region PWP serves to divide or define the microcavity 305.

The liquid crystal injection hole 307 is defined by the upper alignment layer 21 and the lower alignment layer 11.

In an exemplary embodiment, the liquid crystal injection hole formation region 307FP may be formed along the row direction D that the gate line 121a extends. Multiple groups of the plurality of microcavities 305 may be formed in the row direction D. Alternatively, multiple liquid crystal injection hole formation regions 307FP may be formed along the direction that a data line 171 extends. The liquid crystal injection hole 307 may be formed along the direction that the data line 171 extends.

In an exemplary embodiment, the liquid crystal material is injected through the liquid crystal injection hole 307, and the liquid crystal display is formed without an additional upper substrate.

Next, a liquid crystal display according to the present exemplary embodiment will be again described with reference to FIG. 1 to FIG. 4.

Referring to FIG. 1 to FIG. 4, a plurality of gate conductors including a plurality of gate lines 121a, a plurality of step-down gate lines 121b, and a plurality of storage electrode lines 131 are formed on a substrate 110 including transparent glass and/or plastic.

The gate lines 121a and the step-down gate lines 121b are extended in the row direction D and transmit gate signals. Each gate line 121a includes a first gate electrode 124a and a second gate electrode 124b protruding upward and downward, and the step-down gate line 121b includes a third gate electrode 124c protruding upward. The first gate electrode 124a and the second gate electrode 124b are connected to each other.

The storage electrode lines 131 are extended in the row direction D and supply a predetermined voltage such as a common voltage Vcom. Each storage electrode line 131 includes a storage electrode 129 protruding up and down, a pair of longitudinal portions 134 extending substantially perpendicular to the gate lines 121a and 121b, and a transverse portion 127 connecting ends of a pair of longitudinal portions 134. The transverse portion 127 includes a capacitive electrode 137 extending downward.

A gate insulating layer (not shown) may be formed on the gate conductors 121a, 121b, and 131.

A plurality of semiconductor stripes (not shown) may include amorphous silicon and/or crystallized silicon and may be formed on the gate insulating layer. The semiconductor stripes are extended in the column direction, and include first and second semiconductors 154a and 154b protruding toward the first and second gate electrodes 124a and 124b connected to each other. A third semiconductor 154c is disposed on the third gate electrode 124c.

A plurality of pairs of ohmic contacts (not shown) may be formed on the semiconductors 154a, 154b, and 154c. The ohmic contacts may include silicide and/or n+ hydrogenated amorphous silicon doped with an n-type impurity at a high concentration.

A data conductor including a plurality of data lines 171, a plurality of first drain electrodes 175a, a plurality of second drain electrodes 175b, and a plurality of third drain electrodes 175c may be formed on the ohmic contacts.

The data lines 171 transmit data signals and are extended in the column direction crossing the row direction D that the gate lines 121a and the step-down gate lines 121b are extended. Each data line 171 includes a first source electrode 173a and a second source electrode 173b extending toward the first gate electrode 124a and the second gate electrode 124b connected to each other.

The first drain electrode 175a, the second drain electrode 175b, and a third drain electrode 175c each include one end having a wide area and the other end of the bar type. Bar ends of the first drain electrode 175a and the second drain electrode 175b are partially enclosed by the first source electrode 173a and the second source electrode 173b. The wide end of the first drain electrode 175a is extended to form a third drain electrode 175c having a "U" shape. A wide end 177c of the third source electrode 173c overlaps the capacitive electrode 137 to form a step-down capacitor Cstd, and the bar end of the third source electrode 173c is partially enclosed by the third drain electrode 175c.

The first gate electrode 124a, the first source electrode 173a, and the first drain electrode 175a constitute a first thin film transistor Qa along with the first semiconductor 154a. The second gate electrode 124b, the second source electrode 173b, and the second drain electrode 175b constitutes a second thin film transistor Qb along with the second semiconductor 154b. The third gate electrode 124c, the third source electrode 173c, and the third drain electrode 175c constitute a third thin film transistor Qc along with the third semiconductor 154c.

The semiconductor stripes including the first semiconductor 154a, the second semiconductor 154b, and the third semiconductor 154c except for the channel region between the source electrodes 173a, 173b, and 173c, and the drain electrodes 175a, 175b, and 175c have substantially the same plane shape as the data conductors 171, 175a, 175b, and 175c and the underlying ohmic contacts.

The first semiconductor 154a includes a portion exposed between the first source electrode 173a and the first drain electrode 175a. The second semiconductor 154b includes a portion exposed between the second source electrode 173*b* and the second drain electrode 175*b*. The third semiconductor 154*c* includes a portion exposed between the third source electrode 173*c* and the third drain electrode 175*c*.

A lower passivation layer (not shown) may include an inorganic insulator such as silicon nitride and/or silicon oxide and may be disposed on the data conductors 171, 175*a*, 175*b*, and 175*c* and the exposed portion of first, second, and third semiconductors 154*a*, 154*b*, and 154*c*.

A color filter 230 may be disposed on the lower passivation layer, except for the first thin film transistor Qa, the second thin film transistor Qb, and the third thin film transistor Qc. The color filter 230 is extended in the column direction. The color filter 230 is disposed under the pixel electrode 191. Alternatively, it may be formed on the common electrode 270.

The light blocking member 220 is disposed between the color filters 230. For example, the light blocking member 220 includes the transverse light blocking member 220*a* and the longitudinal light blocking member 220*b*. The transverse light blocking member 220*a* is extended along the gate line 121*a* and the step-down line 121*b* and covers the region at which the first thin film transistor Qa, the second thin film transistor Qb, and the third thin film transistor Qc are disposed. The longitudinal light blocking member 220*b* is extended along the data line 171.

The light blocking member 220, referred to as a black matrix, prevents light leakage.

Contact holes 185*a* and 185*b* may penetrate the lower passivation layer and the light blocking member 220 to expose the first drain electrode 175*a* and the second drain electrode 175*b*.

The first passivation layer 170 is disposed on the color filter 230 and the light blocking member 220. The pixel electrode 191 including the first sub-pixel electrode 191*a* and the second sub-pixel electrode 191*b* is disposed on the first passivation layer 170. The first sub-pixel electrode 191*a* and the second sub-pixel electrode 191*b* are spaced apart in the column direction, and thererbetween are the gate line 121*a* and the step-down gate line 121*b* disposed. The height of the second sub-pixel electrode 191*b* may be substantially equal to or greater than the height of the first sub-pixel electrode 191*a*, and may be in a range of about 1 to about 3 times that of the first sub-pixel electrode 191*a*.

The first sub-pixel electrode 191*a* and the second sub-pixel electrode 191*b* respectively include cross stems including transverse stems 193*a* and 193*b* and longitudinal stems 192*a* and 192*b* crossing the transverse stems 193*a* and 193*b*. Also, the first sub-pixel electrode 191*a* and the second sub-pixel electrode 191*b* respectively include a plurality of minute branches 194*a* and 194*b* and protrusions 197*a* and 197*b* protruding up or down from the edges of the sub-pixel electrodes 191*a* and 191*b*.

The pixel electrode 191 is divided into four sub-regions by the transverse stems 193*a* and 193*b* and the longitudinal stems 192*a* and 192*b*. The minute branches 194*a* and 194*b* obliquely extend from the transverse stems 193*a* and 193*b* and the longitudinal stem 192*a* and 192*b*, and the extending direction thereof forms an angle of about 45 degrees or 135 degrees with the gate lines 121*a* and 121*b* or the transverse stems 193*a* and 193*b*. Also, the extending direction of the minute branches 194*a* and 194*b* of two neighboring sub-regions may be crossed.

In an exemplary embodiment, the first sub-pixel electrode 191*a* further includes an outer stem enclosing the outer portion, and the second sub-pixel electrode 191*b* further includes a transverse portion disposed on the upper and lower portions and right and left longitudinal portions 198 disposed on the right and left sides of the first sub-pixel electrode 191*a*. The right and left longitudinal portions 198 may prevent capacitive coupling between the data line 171 and the first sub-pixel electrode 191*a*.

On the pixel electrode 191, the lower alignment layer 11, the microcavity layer 305, the upper alignment layer 21, the common electrode 270, the lower insulating layer 350, and the capping layer 390 are formed, and the description of the constituent elements has already been giving and is omitted here.

As described above, the liquid crystal display is an example of a lateral visibility structure to increase lateral visibility. The present invention is not limited to a liquid crystal display having a lateral visibility structure, but the present invention include various structures.

Figure 6:
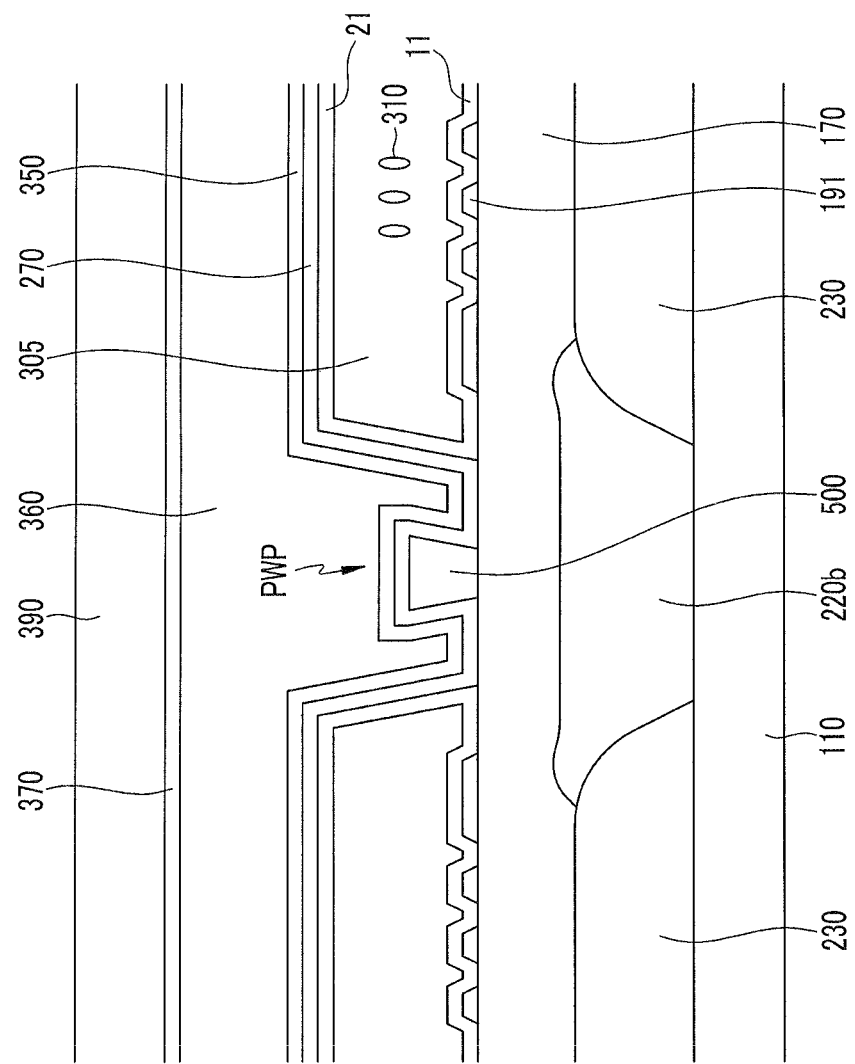
FIG. 6 is a cross-sectional view of a liquid crystal display according to an exemplary embodiment of the present invention.

FIG. 6 is a cross-sectional view of a liquid crystal display according to an exemplary embodiment of the present invention. The liquid crystal display of FIG. 6 is substantially similar to that of FIG. 3, except that the patterned structure 500 has a reverse-tapered structure. This reverse-tapered structure of the patterned structure 500 serves to mechanically hold the roof layer 360 and prevent the roof layer 360 from being lifted.

Figure 7:
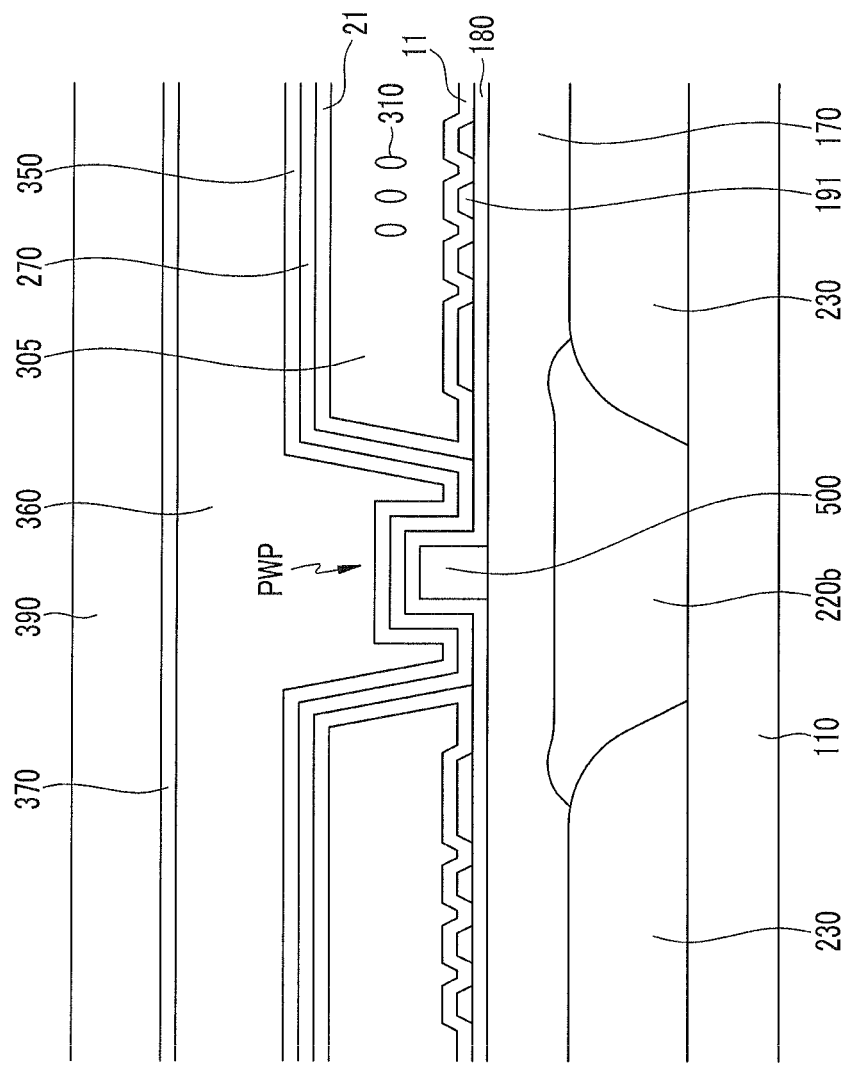
FIG. 7 is a cross-sectional view of a liquid crystal display according to an exemplary embodiment of the present invention.

FIG. 7 is a cross-sectional view of a liquid crystal display according to an exemplary embodiment of the present invention. The liquid crystal display of FIG. 6 is substantially similar to that of FIG. 3, except that the second passivation layer 180 covers the patterned structure 500. The second passivation layer 180 serves to stay the patterned structure 500 in place when the roof layer 360 is lifted in a subsequent process.

Figure 8:
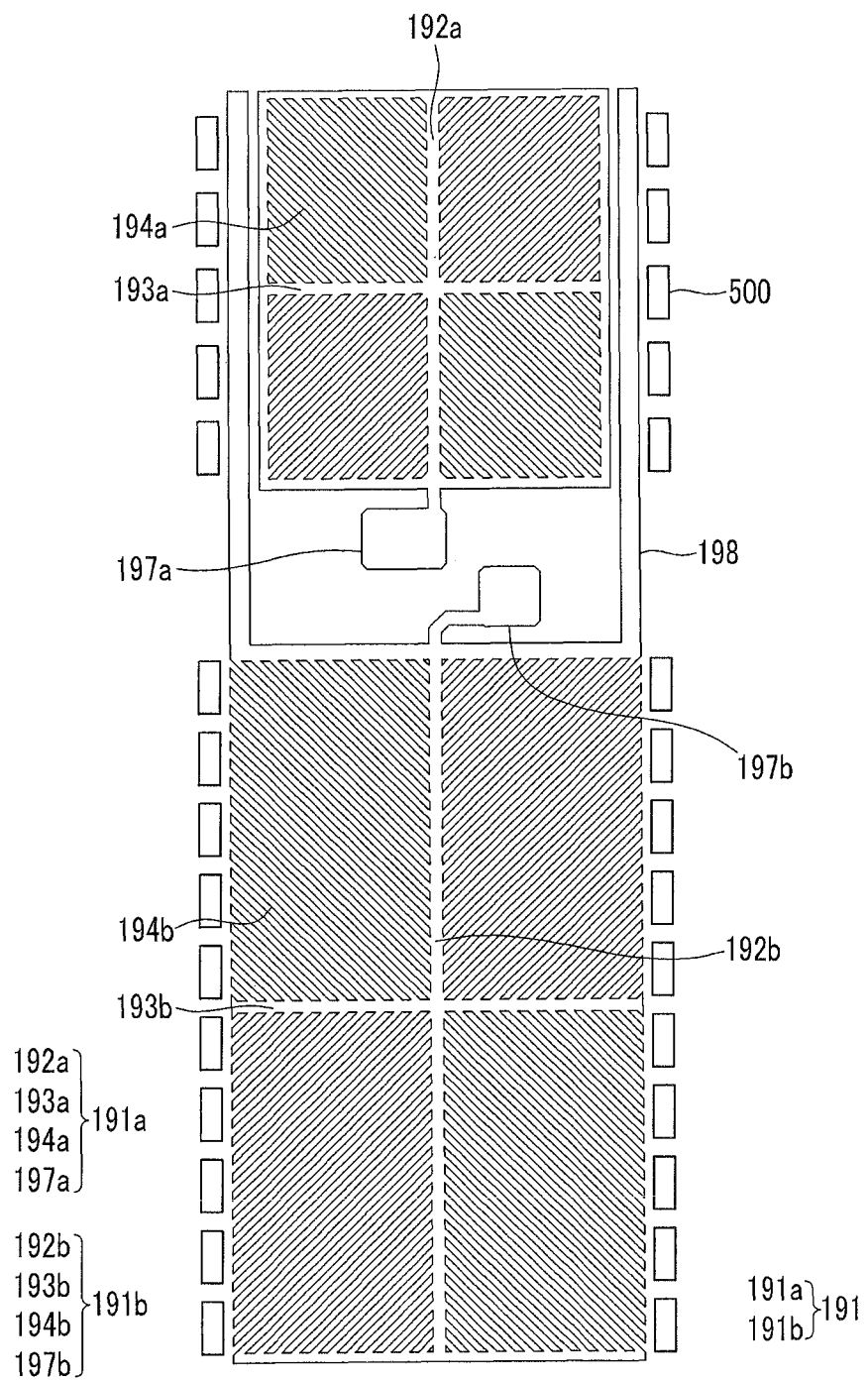
FIG. 8 is a top plan view of a liquid crystal display according to an exemplary embodiment of the present invention.

FIG. 8 is a top plan view of a liquid crystal display according to an exemplary embodiment of the present invention. The liquid crystal display is substantially similar to that of FIG. 2, except for the patterned structure 500. The patterned structure 500 of FIG. 8 includes a plurality of unit pieces spaced apart from each other. This spaced-apart patterned structure 500 increases a surface area contacting the roof layer 360 and serves to prevent the roof layer 360 from being lifted in a subsequent process.

Next, an exemplary embodiment of manufacturing the liquid crystal display described with reference to FIG. 1 to FIG. 5 will be described. FIG. 9 to FIG. 14 are cross-sectional views, taken along line III-III of FIGS. 1 and 2, of showing a method of manufacturing the liquid crystal display of FIG. 1 to FIG. 5.

Figure 9:
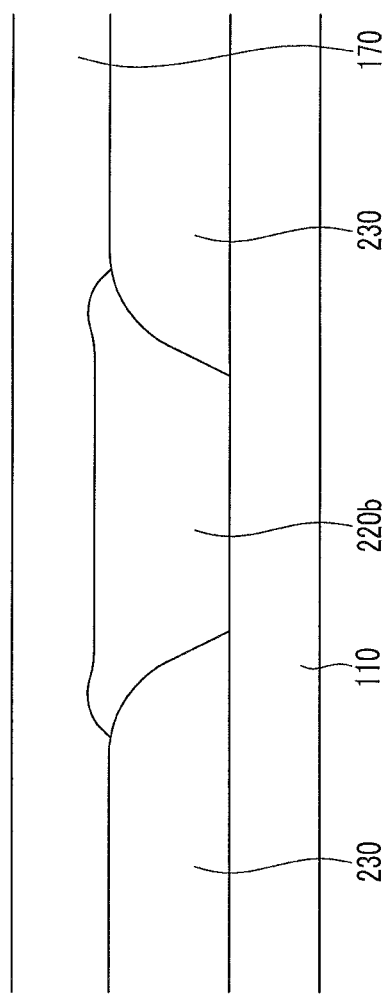
FIG. 9 to FIG. 14 are cross-sectional views of a method of manufacturing a liquid crystal display of FIG. 1 to FIG. 5, respectively.

Referring to FIG. 9, the thin film transistors Qa, Qb, and Qc of FIG. 1 are formed on the substrate 110 including transparent glass and/or plastic. The color filter 230 is formed on the thin film transistors Qa, Qb, and Qc in a corresponding pixel area. The light blocking member 220 including the transverse light blocking member 220*a* and the longitudinal light blocking member 220*b* are formed between the adjacent color filters 230. The longitudinal light blocking member 220*b* overlaps the edge of the adjacent color filters 230.

Figure 10:
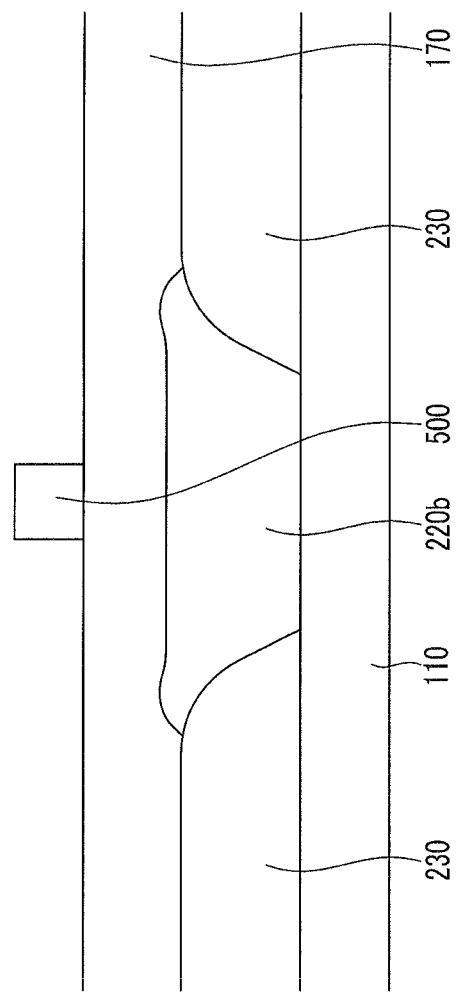

Referring to FIG. 10, the first passivation layer 170 is formed on the color filter 230 and the light blocking member 220. The first passivation layer 170 may include an organic material or an inorganic material. The first passivation layer 170 may include a single layer or at least two layers having different properties. For example, the first passivation layer 170 includes a lower organic material layer and an upper inorganic material layer. The patterned structure 500 is formed on the first passivation layer 170 using a photolithography process. The patterned structure 500 serves as a fixing member to prevent the roof layer 360 from being lifted from the lower insulating layer 350, or the common electrode 270 underneath the roof layer 360 and the first passivation layer 170.

The patterned structure 500 is extended along the extending direction of the data line 171. The invention is not limited thereto. For example, the patterned structure 500, as shown in FIG. 8, may include a plurality of unit pieces spaced apart from each other. The patterned structure 500, as shown in FIG. 6, may have the reverse-tapered structure.

Next, to harden the patterned structure 500, a bake process may be performed at a temperature of about 220° C.

Figure 11:
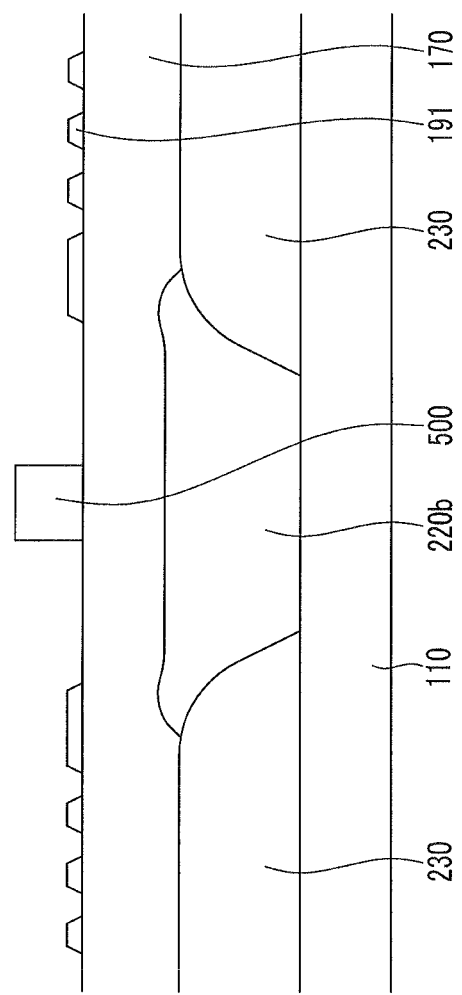

Referring to FIG. 11, the pixel electrode is formed on the first passivation layer 170. For example, a preliminary layer for forming the pixel electrode 191 is formed on the first passivation layer 170. The preliminary layer is formed on the first passivation layer and is patterned to form the pixel electrode 191 in the corresponding pixel area. The pixel electrode 191 is electrically connected to one terminal of the thin film transistors Qa and Qb through the contact holes 185a and 185b (shown in FIG. 1). The pixel electrode 191 has the shape of FIG. 2. The present invention is not limited thereto, but the pixel electrode 191 may have various shapes.

Figure 12:
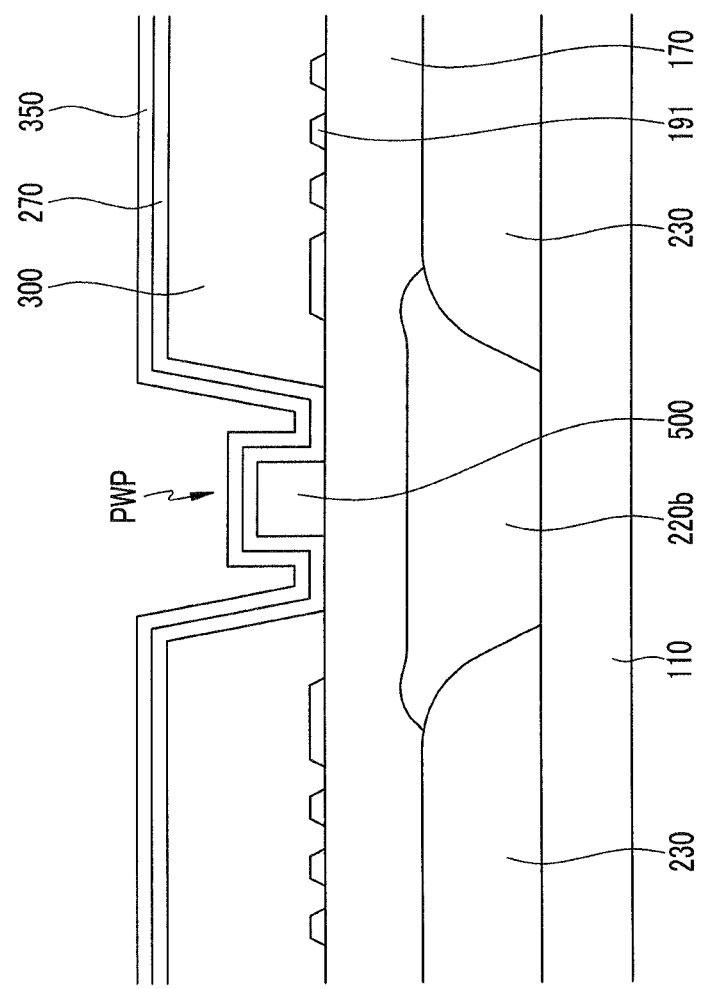

Referring to FIG. 12, a sacrificial layer 300 is formed on the pixel electrode 191. The sacrificial layer 300 may include an organic material such as silicon oxycarbide (SiOC) and/or a photoresist.

The sacrificial layer 300 is exposed/developed or patterned to form the partition forming region PWP on the longitudinal light blocking member 220b.

The common electrode 270 and the lower insulating layer 350 are sequentially formed on the sacrificial layer 300. The common electrode 270 may include the transparent conductor such as indium tin oxide (ITO) or indium zinc oxide (IZO), and the lower insulating layer 350 may include silicon nitride (SiNx) and/or silicon oxide (SiO2). The common electrode 270 and the lower insulating layer 350 are formed in the partition forming region PWP and cover the patterned structure 500 disposed between the microcavities 305. In an exemplary embodiment, the common electrode 270 and/or the lower insulating layer 350 need not be formed in the partition forming region PWP. Alternatively, the common electrode 270 need not cover a side surface of the sacrificial layer 300 or may partially cover the side surface of the sacrificial layer 300.

Figure 13A:
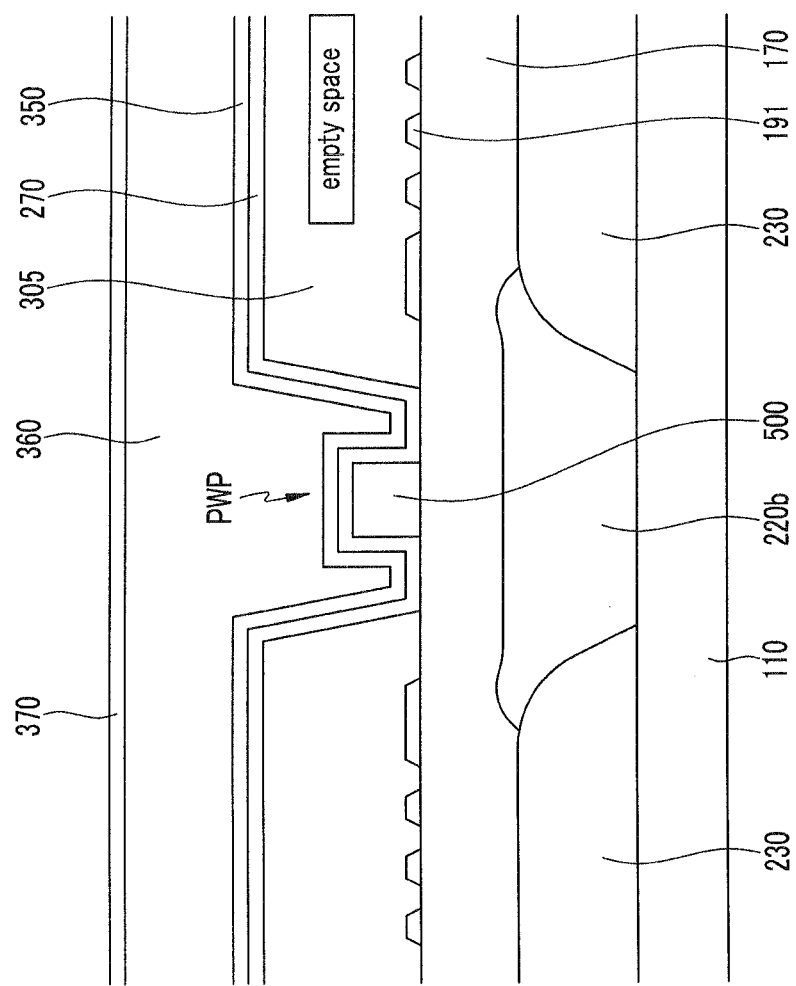

Referring to FIG. 13A, the roof layer 360 and the upper insulating layer 370 are sequentially formed on the lower insulating layer 350. The roof layer 360 may include a different material from that of the sacrificial layer 300. The upper insulating layer 370 may include silicon nitride (SiNx) and/or silicon oxide (SiO2). The roof layer 360 encloses the patterned structure 500 and is prevented from being lifted in a manufacturing process.

FIG. 13B is a cross-sectional view taken along line IV-IV of FIG. 1. Referring to FIG. 13B, a preliminary roof layer is formed on the lower insulating layer 350. The preliminary roof layer is partially removed to form the roof layer 360 and exposes the lower insulating layer 350 underneath the removed portion of the preliminary roof layer. A space between the roof layers 360 overlaps the transverse light blocking member 220a. A preliminary upper insulating layer is formed on the roof layers 360. The exposed portion of the lower insulating layer 350 is disposed underneath the removed portion of the preliminary roof layer.

Next, the preliminary upper insulating layer, the lower insulating layer 350, and the common electrode 270 are partially removed to form a liquid crystal injection hole formation region 307FP which exposes the sacrificial layer 300.

The upper insulating layer 370 covers the roof layer 360. Using an oxygen (O2) ashing process or a wet etching process, the sacrificial layer 300 is removed through the liquid crystal injection hole formation region 307FP. Accordingly, the microcavity 305, defined by the 191 and 270, is formed and the microcavity 305 includes the liquid crystal injection hole 307. The microcavity 305 is a space left behind when the sacrificial layer 300 is removed.

A method of forming the liquid crystal injection hole formation region 307FP is not limited to one as described above, but the liquid crystal injection hole formation region 307FP may be formed in various ways. For example, the sequence of removing the layers 370, 360 and 350 and the common electrode 270 may be different from that as described above.

The liquid crystal injection hole 307 may be formed along the direction parallel to a signal line connected to the thin film transistor. If the sacrificial layer 300 is removed, as shown in FIG. 13A, the common electrode 270, the lower insulating layer 350, and the roof layer 360 define the microcavity 305.

Figure 14:
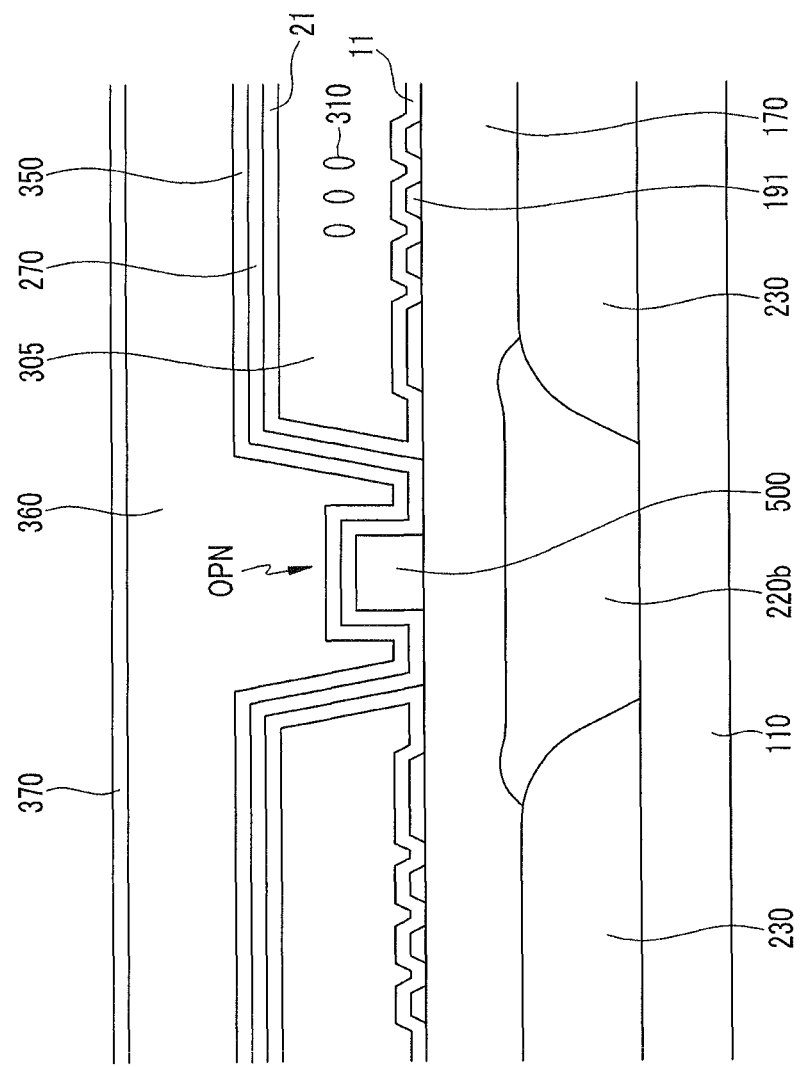

Referring to FIG. 14, an aligning material is injected through the liquid crystal injection hole 307 shown in FIG. 13B to form alignment layers 11 and 21 on the pixel electrode 191 and the common electrode 270. A bake process, then, is performed to remove a solvent from the aligning material.

Next, the liquid crystal material including the liquid crystal molecules 310 is injected through the liquid crystal injection hole 307 to the microcavity 305 by an inkjet method.

Next, the capping layer 390 is formed on the roof layer 360. The capping layer 390 fills the liquid crystal injection hole formation region 307FP and covers the liquid crystal injection hole 305 of the microcavity 305 to form the liquid crystal display as shown in FIG. 3 and FIG. 4.

Figure 15:
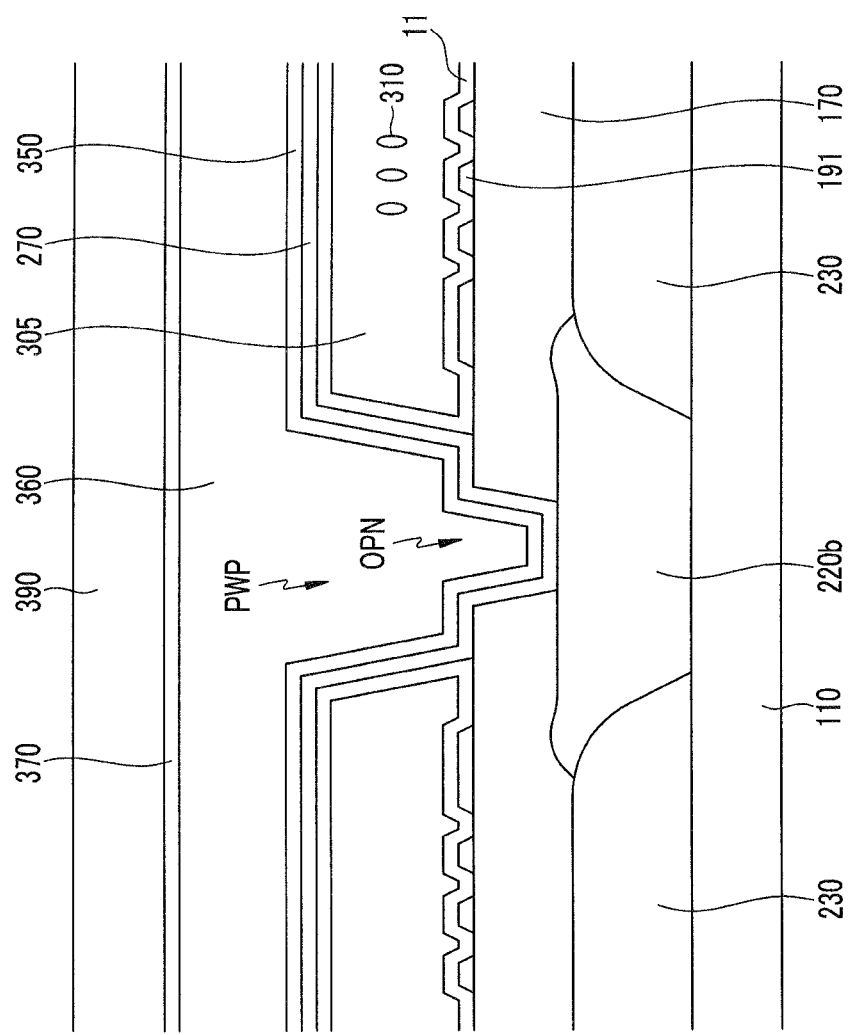
FIG. 15 is a cross-sectional view of a liquid crystal display according to an exemplary embodiment of the present invention.

FIG. 15 is a cross-sectional view of a liquid crystal display according to an exemplary embodiment of the present invention.

Referring to FIG. 15, a liquid crystal display is substantially similar to that of FIG. 3, except for the structure of the roof layer 360.

Referring to FIG. 15, an open region OPN is formed in the first passivation layer 170. The open region OPN is connected to the partition forming region PWP. The open region OPN is narrower than the partition forming region PWP. The roof layer 360 is formed in the partition forming region PWP and the open region OPN. The open region OPN is extended along the extending direction of a signal line connected to the thin film transistor.

The common electrode 270, the lower insulating layer 350, the roof layer 360, and the upper insulating layer 380 disposed on the microcavity 305 fill the open region OPN and the partition forming region PWP. Since the open region OPN increases a contact area of the roof layer 360, the open region OPN serves as a fixing member to prevent the roof layer 360 from being lifted off in a subsequent process FIG. 16 is a schematic diagram of an open region of FIG. 15 in a plane view according to an exemplary embodiment.

Referring to FIG. 16, the open region OPN may have various shape including a linear shape (FIG. 16 (a)), a ladder shape (FIG. 16 (b)), a zigzag shape (FIG. 16 (c)), or an arrow shape (FIG. 16 (d)).

Figure 17:
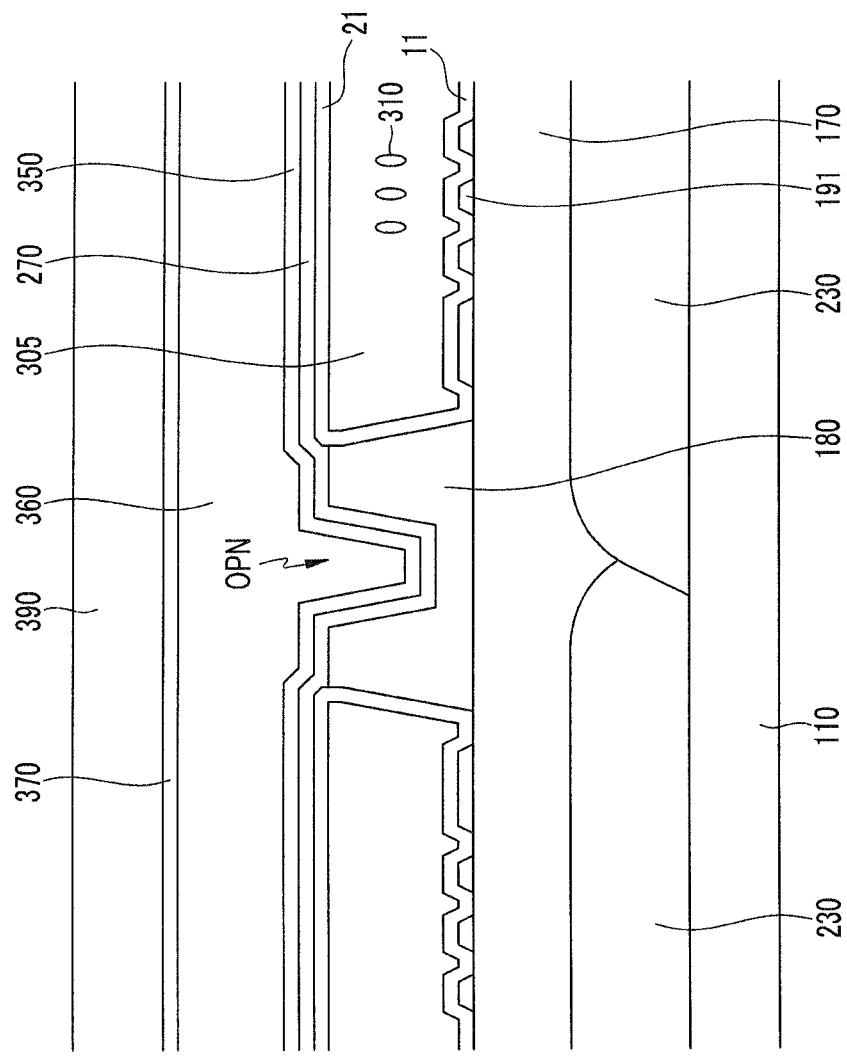
FIG. 17 is a cross-sectional view of a liquid crystal display according to an exemplary embodiment of the present invention.

FIG. 17 is a cross-sectional view of a liquid crystal display according to an exemplary embodiment of the present invention.

Referring to FIG. 17, a liquid crystal display is substantially similar to that of FIG. 15, except that the first passivation layer 170 does not include an open region. An organic layer 180 is formed between the microcavities 305. The organic layer 180 is disposed at the same level as the microcavity 305. The organic layer 180 may serve as a light blocking member and/or a column spacer.

In an exemplary embodiment, an open region OPN having a groove shape is formed in the organic layer 180 and increases a contact area of the roof layer 360. Since the open region OPN increases a contact area of the roof layer 360, the open region OPN serves as a fixing member to prevent the roof layer 360 from being lifted off in a subsequent process.

Figure 18:
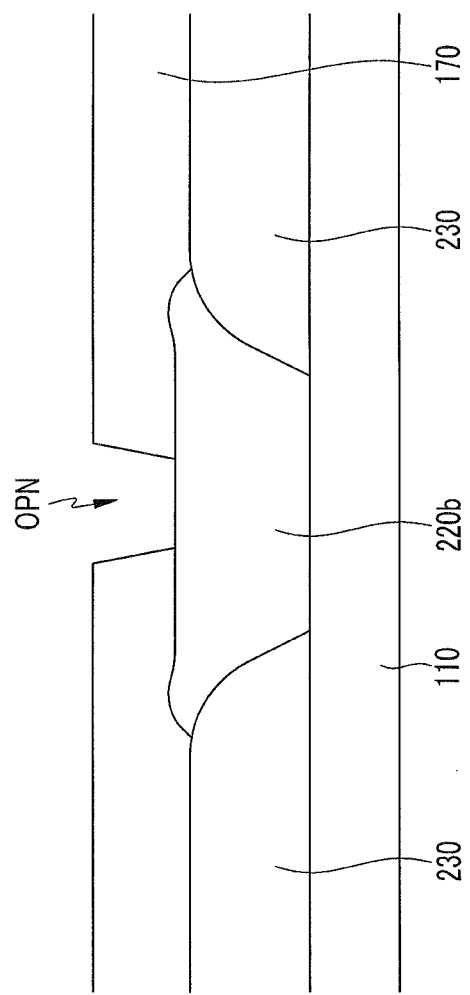
FIG. 18 to FIG. 20 are cross-sectional views of a manufacturing method of the liquid crystal display described in FIG. 15.
Figure 19:
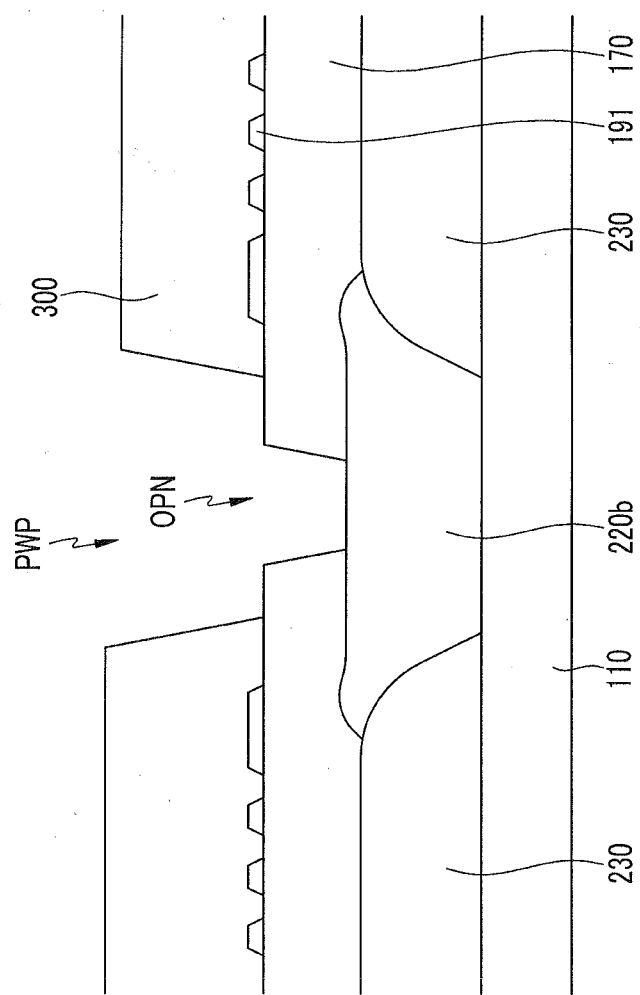
Figure 20:
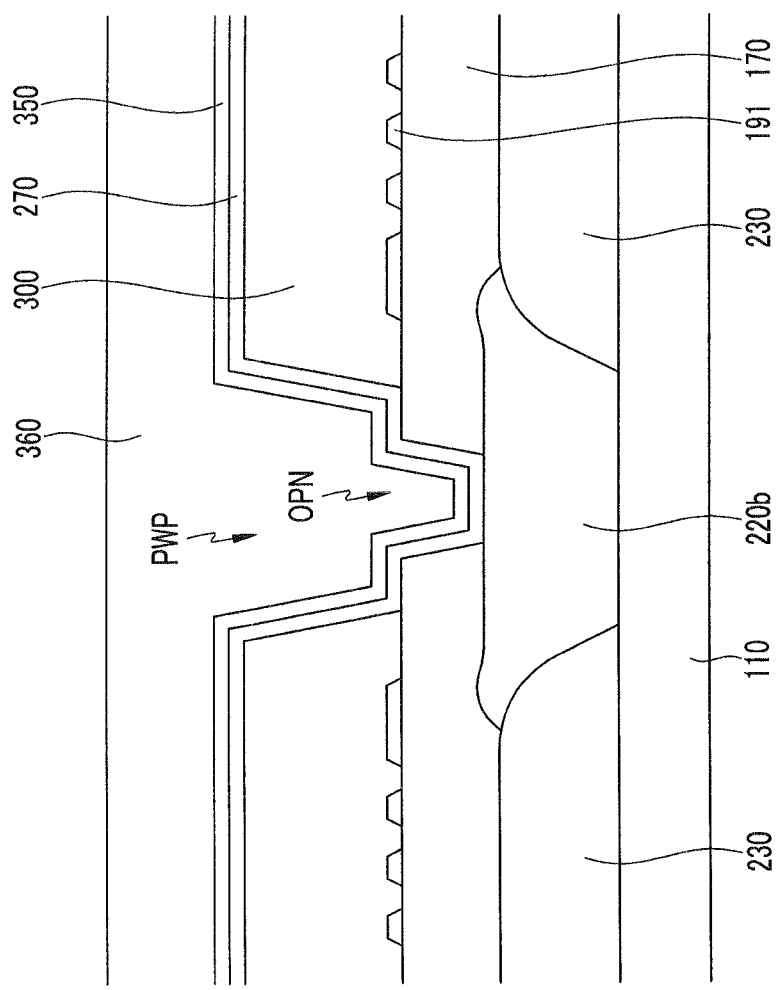

FIG. 18 to FIG. 20 are cross-sectional views of a manufacturing method of the liquid crystal display of FIG. 15. This manufacturing method is substantially similar to that as described with reference to FIG. 9 to FIG. 14, and differences will be described.

Referring to FIG. 18, the first passivation layer 170 including an organic material is formed, and the open region OPN is formed in the first passivation layer 170. The open region OPN is extended along the extending direction of a signal line connected to a thin film transistor.

Referring to FIG. 19, the pixel electrode 191 is formed and the sacrificial layer 300 is formed on the pixel electrode 191. The sacrificial layer 300 is exposed/developed or patterned to form the partition forming region PWP having a larger width than the open region OPN.

Referring to FIG. 20, the common electrode 270 and the lower insulating layer 350 filling the partition forming region PWP are formed on the sacrificial layer 300. Next, the roof layer 360 is formed on the lower insulating layer 350. Since the open region OPN increases a contact area of the roof layer 360, the open region OPN serves as a fixing member to prevent the roof layer 360 from being lifted off in a subsequent process. Subsequent processes is substantially similar to those described in FIGS. 13 and 14.

While the present inventive concept has been shown and described with reference to exemplary embodiments thereof, it will be apparent to those of ordinary skill in the art that various changes in form and detail may be made therein without departing from the sprit and scope of the inventive concept as defined by the following claims.

What is claimed is:

1. A liquid crystal display comprising:
    a substrate;
    a first passivation layer disposed on the substrate;
    a first microcavity disposed on the first passivation layer;
    a second microcavity disposed on the first passivation layer and spaced apart from the first microcavity at a first spacing and along a first direction;
    a fixing member disposed between the first microcavity and the second microcavity, wherein a plane of a top surface of the fixing member is located between planes of bottom and top surfaces of the first microcavity; and
    a roof layer disposed on the first and the second microcavities and the fixing member,
    wherein the first and the second microcavities include liquid crystal molecules.

2. The liquid crystal display of claim 1, further comprising:
    a third microcavity disposed on the first passivation layer and spaced apart from the first microcavity along a second direction crossing the first direction, wherein the first microcavity includes at least one liquid crystal injection hole facing in the second direction.

3. The liquid crystal display of claim 2, further comprising:
    a capping layer disposed on the roof layer and covering the at least one liquid crystal injection hole.

4. The liquid crystal display of claim 1, further comprising:
    a light blocking layer disposed between the substrate and the first passivation layer, wherein the fixing member overlaps the light blocking layer.

5. The liquid crystal display of claim 4, wherein the fixing member includes an open region penetrating the first passivation region and exposing the light blocking layer, the open region having a second width smaller than the first spacing, wherein the roof layer fills the open region.

6. The liquid crystal display of claim 1, wherein the fixing member includes a patterned structure disposed on the first passivation layer and having a first width smaller than the first spacing.

7. The liquid crystal display of claim 6, wherein the patterned structure includes a photoresist, an organic material, or an inorganic material.

8. The liquid crystal display of claim 7, further comprising: a second passivation layer covering the patterned structure.

9. The liquid crystal display of claim 6, wherein the patterned structure is extended along the second direction crossing the first direction.

10. The liquid crystal display of claim 6, wherein the patterned structure includes a plurality of unit pieces spaced apart from each other along the second direction.

11. The liquid crystal display of claim 6, wherein the patterned structure has a reverse-tapered sidewall.

12. The liquid crystal display of claim 1, further comprising:
    a space interposed between the first and the second microcavities, wherein the space is defined by the fixing member, and the first and the second microcavities, wherein the space further includes a groove formed in the first passivation layer.

13. A method of manufacturing a liquid crystal display, comprising:
    forming a thin film transistor on a substrate;
    forming a first passivation layer on the thin film transistor;
    forming a fixing member on the first passivation layer;
    forming a pixel electrode on the first passivation layer;
    forming a sacrificial layer on the pixel electrode, wherein a plane of a top surface of the fixing member is located between planes of bottom and top surfaces of the sacrificial layer;
    forming a roof layer on the sacrificial layer and the fixing member;
    removing the sacrificial layer to form a plurality of microcavities having a liquid crystal injection hole;
    injecting a liquid crystal material into the plurality of microcavity; and
    forming a capping layer on the roof layer to cover the liquid crystal injection hole.

14. The method of claim 13, wherein the fixing member includes a patterned structure disposed on an upper surface of the first passivation layer and wherein the patterned structure includes photoresist, an organic material, or an inorganic material.

15. The method of claim 14, further comprising: forming a second passivation layer covering the fixing member.

16. The method of claim 14, wherein the roof layer is disposed between two adjacent microcavities of the plurality of microcavity, covering the patterned structure disposed between the microcavities.

17. The method of claim 13, further wherein the fixing member includes an open region penetrating the first passivation layer and wherein the roof layer fills the open region.

18. A method manufacturing a liquid crystal display, comprising:
    forming a thin film transistor on a substrate;
    forming an organic layer on the thin film transistor;
    forming a groove in the organic layer;

forming a pixel electrode connected to one terminal of the thin film transistor;

forming a sacrificial layer on the pixel electrode;

forming a roof layer on the sacrificial layer, filling the groove;

removing the sacrificial layer to form a plurality of microcavity having a liquid crystal injection hole;

injecting a liquid crystal material into the plurality of microcavity; and forming a capping layer covering the liquid crystal injection hole on the roof layer, wherein a bottom surface of the groove is higher than a bottom surface of the sacrificial layer.

19. The method of claim 18, wherein the organic layer is formed between two adjacent microcavities of the plurality of microcavity.

20. The method of claim 19, wherein the organic layer is formed at substantially the same level as the two adjacent microcavities.

* * * * *